United States Patent [19]

Watson

[11] 4,202,107
[45] May 13, 1980

[54] REMOTE AXIS ADMITTANCE SYSTEM

[76] Inventor: Paul C. Watson, Assembly Associates, P.O. Box 45, Arlington Heights, Mass. 02175

[21] Appl. No.: 953,492
[22] Filed: Oct. 23, 1978
[51] Int. Cl.² .............................................. G01B 5/25
[52] U.S. Cl. ................................ 33/169 C; 33/185 R; 33/189
[58] Field of Search ................. 33/169 C, 185 R, 189, 33/169 C, 172 P, 174 Q, 191, 174 L, DIG. 13, 149 R, 150

[56] References Cited

U.S. PATENT DOCUMENTS

| | | | |
|---|---|---|---|
| 3,534,479 | 10/1970 | Evans | 33/149 J |
| 3,673,695 | 7/1972 | Rethwish | 33/174 L |
| 4,098,001 | 7/1978 | Watson | 33/169 C |
| 4,155,169 | 5/1979 | Drake et al. | 33/185 R |

*Primary Examiner*—Willis Little
*Attorney, Agent, or Firm*—Charles Hieken

[57] ABSTRACT

A member having an axis to be positioned in an opening whose axis may be displaced from the member axis is connected by three rods, wires or wire ropes equally spaced about the axis secured to a supporting plate and having a first portion generally perpendicular to the plate and a second portion extending downwardly from the first portion with the lower end closer to the member axis than the upper end with the first portions allowing translation of the member and the second portion allowing rotation of the member to enable the member to be aligned in the opening as the upper support member moves downward toward the opening. The rods, wires or wire ropes may be separated by a spreader and reside within an elastic body with damping and be preloaded in tension or compression.

12 Claims, 8 Drawing Figures

REMOTE AXIS ADMITTANCE SYSTEM

BACKGROUND OF THE INVENTION

The present invention relates in general to remote-axis admittance systems and more particularly concerns novel apparatus and techniques useful in a high speed assembler of precision parts to facilitate easy and economical assembly without any external energy source or sensory feedback by using the built-in mechanical properties of the remote-axis admittance system according to the invention. This invention is an improvement of the invention disclosed in U.S. Pat. No. 4,098,001 for REMOTE CENTER COMPLIANCE SYSTEM of Paul C. Watson granted July 4, 1978.

For background, reference is made to the technical paper of Paul C. Watson entitled THE REMOTE CENTER COMPLIANCE SYSTEM AND ITS APPLICATION TO HIGH SPEED ROBOT ASSEMBLIES copyright in 1977 by the Society of Manufacturing Engineers. That paper described a remote center device, usually in the form of a compliance having an effective center or pivot point at or near the assembly interface, such that a force applied at the center does not produce rotation and such that a moment applied to the piece does not produce displacement. These properties permit the device to adapt to misalignments of the hole or peg and to offsets of either the hole or peg, or both, with contact and frictional forces produced at the contact points tending to move the peg into alignment and permit it to move into the hole.

It is an important object of this invention to provide an improved remote-axis admittance system.

It is a further object of the invention to achieve the preceding object while separating motion and elastic force.

It is a further object of the invention to achieve one or more of the preceding objects while providing a safety feature that minimizes damage during an unsuccessful attempt to insert a particular part.

It is another object of the invention to achieve one or more of the preceding objects while providing both damping to significantly reduce oscillations and a restoring force.

It is a further object of the invention to achieve one or more of the preceding objects with apparatus that is relatively free from complexity, relatively easy and inexpensive to manufacture and operates with relatively good reliability.

SUMMARY OF THE INVENTION

According to the invention, remote-axis admittance apparatus comprises a first support means for carrying elements of the system, first means attached to said first support means for allowing translation of an alignable member, and second means coupled to said first means and said alignable member for allowing rotation of said alignable member about an axis thereof. According to one aspect of the invention, the first means comprises a first rod-like portion, such as comprising spring wire, rod or wire rope normally essentially perpendicular to said first support means, said second means comprises a second rod-like portion with its other end connected to the alignable member.

According to other aspects of the invention, the rod-like portions may comprise wire cables in tension or compression surrounded by elastic elements comprising an elastomer or rubber with an annular spreader being inserted between the first and second portions. The portions may be in compression or tension. An important feature of the invention resides in separating motion and elastic force. The elastic force is distributed through the body by the elastic elements, and the motion is determined by the constraints imposed by the rod-like portions.

Numerous other features, objects and advantages of the invention will become apparent from the following specification when read in connection with the accompanying drawing in which:

DETAILED DESCRIPTION OF PREFERRED EMBODIMENTS

Figure 1:
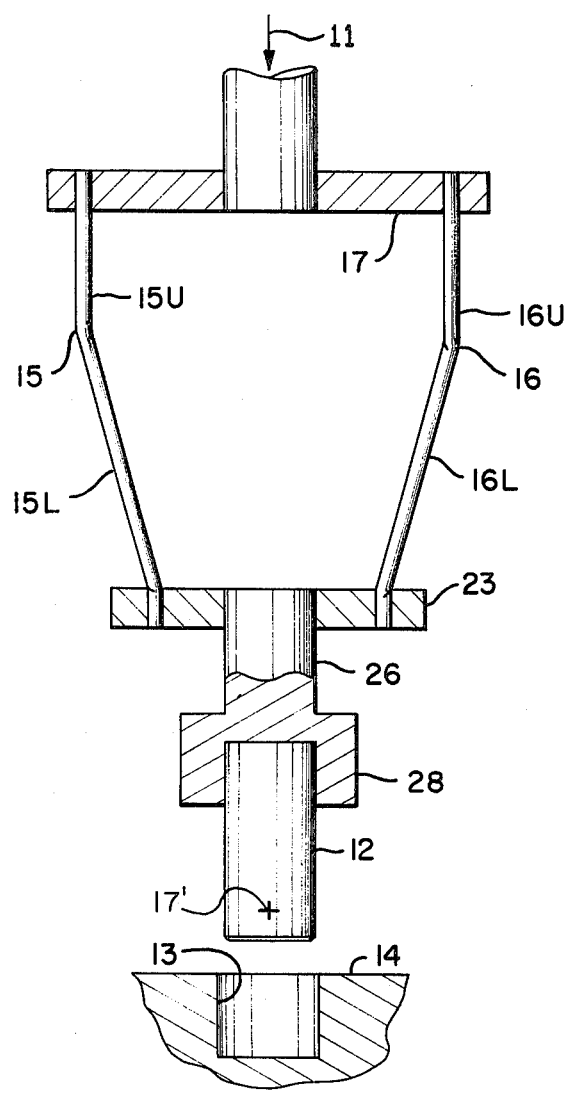
FIG. 1 is a diametrical longitudinal sectional view of an embodiment of the invention.

With reference now to the drawing and more particularly FIG. 1 thereof, there is shown a longitudinal sectional view of a remote axis admittance system according to the invention suitable for inserting chamfered bodies. A downward force 11, causes the assembly to center part 12 and insert it in opening 13 of work 14. The same reference symbols identify corresponding elements throughout the drawing. Support plate 17 carries three wires equally spaced about the axis of the assembly, two of which, 15 and 16 are visible in FIG. 1 having upper portions 15U and 16U, respectively, defining a translation region and lower portions 15L and 16L defining a rotation region extending downwardly and inwardly where they are connected to annular plate 23 to which is attached hollow part gripper shaft 26, comprising alignable means which embraces the compliance center 27. The upper ends of portions 15U and 16U are connected to support plate 17.

Figure 1A:
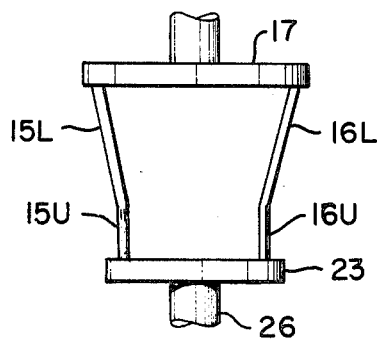
FIG. 1A is a diagrammatic representation of an alternative embodiment of FIG. 1 in which translation and rotation portions are transposed.

Referring to FIG. 1A, there is shown a diagrammatic representation of an alternative embodiment of the invention in which the translation portions such as 15U and 16U are transposed with rotation portions 15L and 16L. This alternative embodiment of the invention incorporates the principles of the invention. It may be desirable in this alternative embodiment to decrease the angle between each of portions 15L and 16L so that the compliance center will remain substantially at 27 as compared with the embodiment in FIG. 1.

Figure 2:
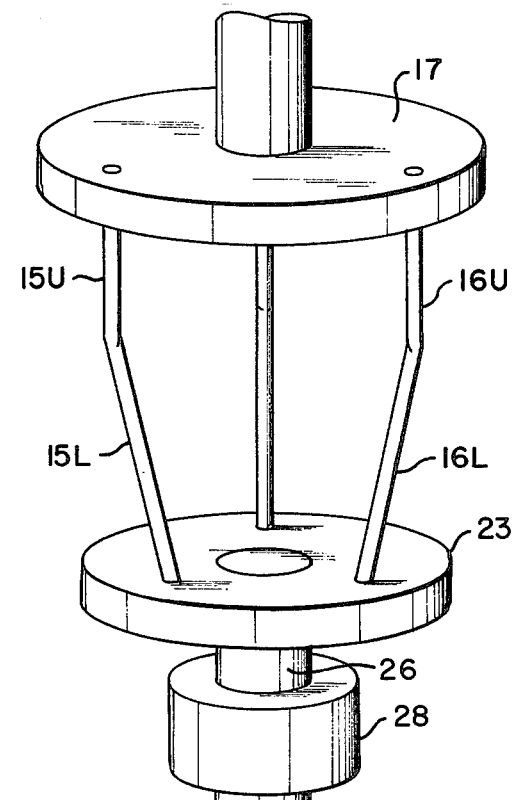
FIG. 2 is a perspective view of a pictorial representation of a portion of the embodiment of FIG. 1.

Referring to FIG. 2, there is shown a perspective view of a pictorial representation of a portion of the embodiment of FIG. 1.

Figure 3:
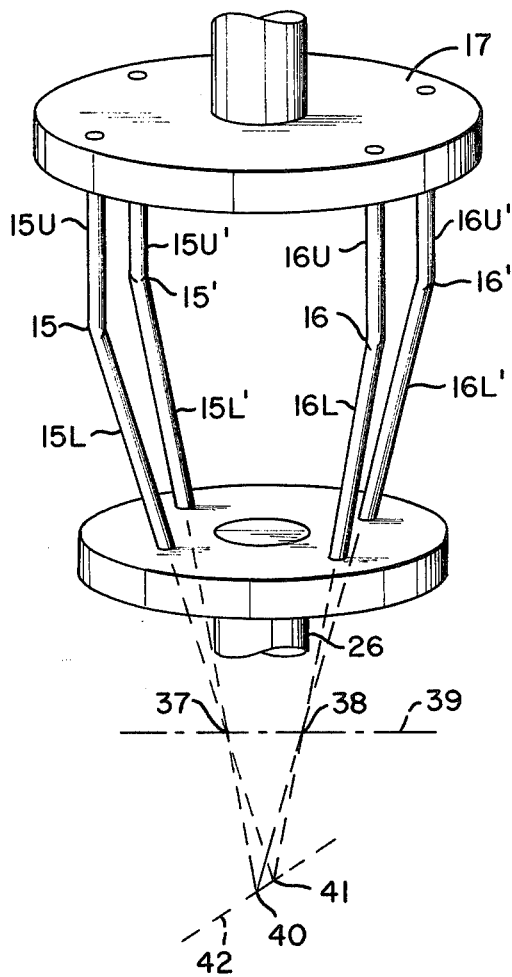
FIG. 3 is a perspective view of a pictorial representation of a portion of the embodiment of FIG. 1 in which the number of wires has been made to be four, thus producing two separate remote axes of rotation.

Referring to FIG. 3, there is shown a perspective view of a pictorial representation of the embodiment of FIG. 1, in which the number of wires has been changed to four. In the embodiment of FIG. 3, two different axes of rotation are obtained. Rotation regions 15L and 15L' have a projected intersection at point 37, and rotation regions 16L and 16L' have a projected intersection at point 38, thus producing an axis of rotation through the two points. This axis is shown as 39 in FIG. 3. Similarly, rotation regions 15L and 16L have a projected intersection at point 41, while rotation regions 15L' and 16L' have a projected intersection at point 40, thus producing an axis of rotation which is shown as 42. If all of the wires have the same angle in respect to the main axis of the assembly, points 37, 38, 40, and 41 will coincide, and a single center of rotation will be obtained instead of the two axes previously described. If a single center is all that is required, the number of wires may be reduced to three.

Operation is as follows: As a force 11 is applied to support plate 17 with part 12 not quite in alignment with opening 13, the right lower corner of part 12 contacts the surface just to the right of opening 13 and portions 15U, 16U rotate clockwise about their upper ends, translating the assembly to the left while lower portions 15L and 16L tend to rotate clockwise to rotate part 12 into opening 13. Substantially the same action occurs with the third wire (not shown in FIG. 1) in a plane perpendicular to the sectional plane of FIG. 1 coacting with one or both of wires 15 or 16. Thus, the upper portions of the wires react to a part encountering resistance entering an opening by producing translation in a direction that moves the part into the opening while the lower portions of the wires produce the rotation that brings the axis of the part into alignment with that of the opening. These results are achieved without any external energy source or sensory feedback, using only the built-in mechanical properties of a system that is relatively free from complexity and capable of operating reliably for many insertions. The invention is especially useful in the wrist of a robot arm for converting a simple arm with limited degrees of freedom into a high speed assembler of precision parts.

Figure 4:
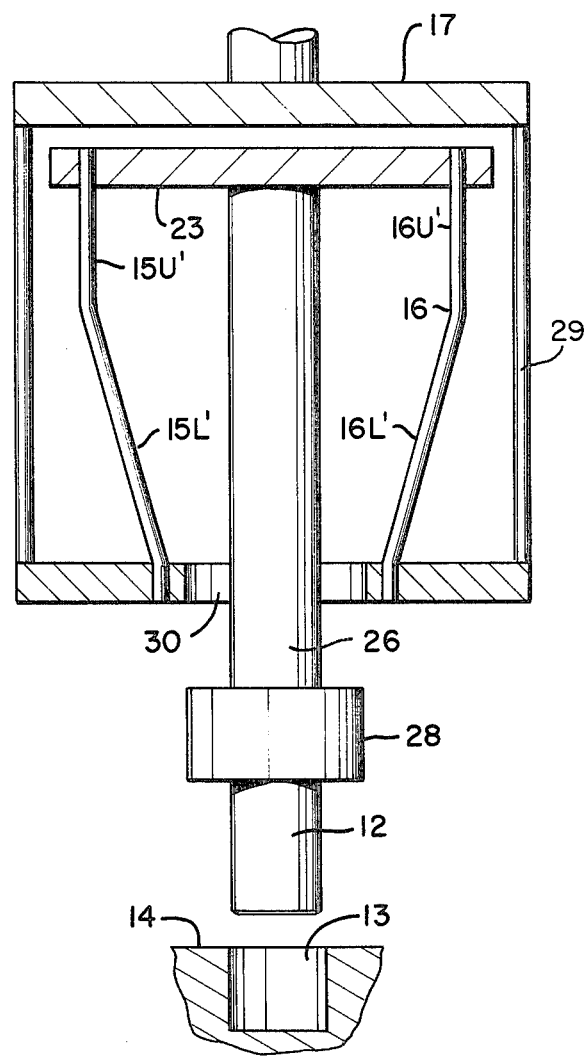
FIG. 4 is a diametrical longitudinal sectional view of another embodiment of the invention with rod-like portions in tension.

Referring to FIG. 4, there is shown a diametrical longitudinal sectional view of another embodiment of the invention with rod-like portions in tension. A cup-shaped member 29 depends from support plate 17 and is formed with an opening 30 for accommodating shaft 26 with lower legs 15L' and 16L' connected to member 29 about opening 30 as shown with the upper ends of portions 15U' and 16U' depending from plate 23. Applying a downward force on support plate 17 causes legs 15' and 16' to be in tension when inserting part 12.

Figure 5:
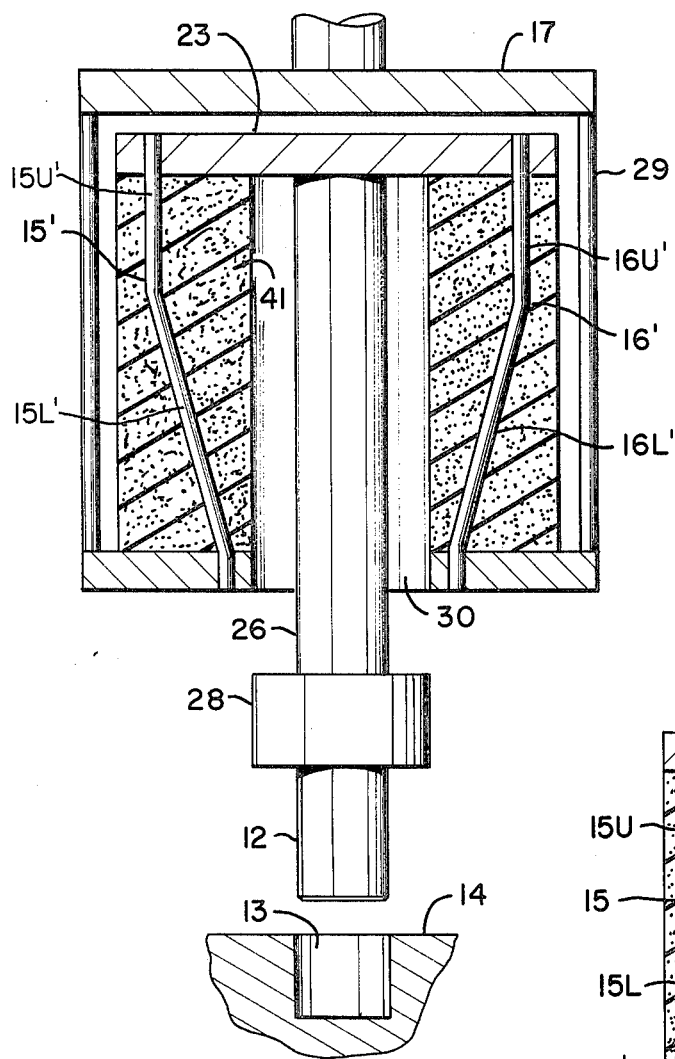
FIG. 5 is a diametrical longitudinal sectional view of another embodiment of the invention having an elastic element with rod-like portions loaded in tension.

Referring to FIG. 5, there is shown a diametrical longitudinal sectional view of another embodiment of the invention in which wire cables 15' and 16' having upper portions 15U' and 16U' and lower portions 15L' and 16L', respectively, enclosed in an elastomer such as rubber 41 with the steel cables 15' and 16' in tension. Cup-shaped member 29 formed with opening 30 is connected to the bottom of legs 15L' and 16L'. The upper ends of legs 15U' and 16U' are connected to plate 23 and may be preloaded in tension by having the annular elastic element 41 in compression. This structural arrangement is especially advantageous in connection with force-fitting parts.

Figure 6:
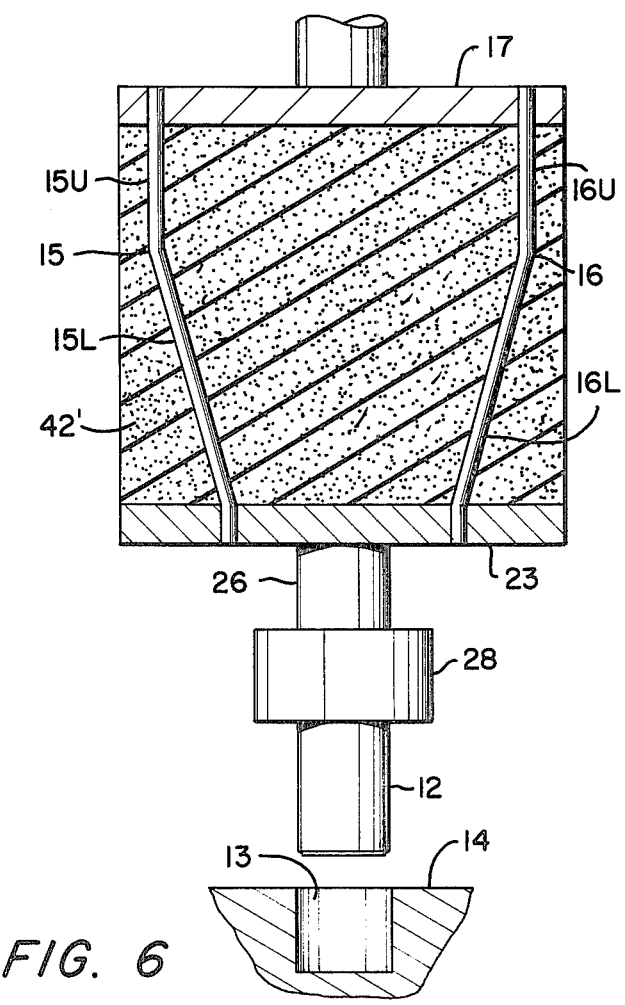
FIG. 6 is a diametrical longitudinal sectional view of another embodiment of the invention having an elastic element with rod-like portions preloaded in tension.

Referring to FIG. 6, there is shown a diametrical longitudinal sectional view of another embodiment of the invention similar to the embodiment of FIGS. 1 and 2 but with an elastic body 42' introducing elastic forces and damping forces on wires 15 and 16 and preloading them to be in tension between plates 17 and 23. This embodiment of the invention is especially advantageous in connection with inserting fragile items. If the item being inserted does not enter for any reason as plate 17 descends, wires 15 and 16 collapse as the preloading force is overcome so that negligible force is then applied to the part 12 then being inserted, and it may be removed without being damaged, and without damage to the admittance.

The embodiments of FIGS. 4 and 5 have been described above as being preloaded in tension. However, they could also be preloaded in compression by arranging elastic elements 41 and 42' to be in tension. In either case a force greater than the preload produces a yielding to form a safety device.

The assembly of FIG. 4 is shown with the cables in tension. All of these embodiments are characterized by a center of compliance located near the end of the part to be inserted. The exact effects of varying the location of the center are shown by equations and analysis in the background reference.

In the embodiments of FIGS. 5 and 6, the rod-like elements 15 and 16 define the trajectories of motion, while the elastic elements such as 41 and 42' provide the forces and damping.

Figure 7:
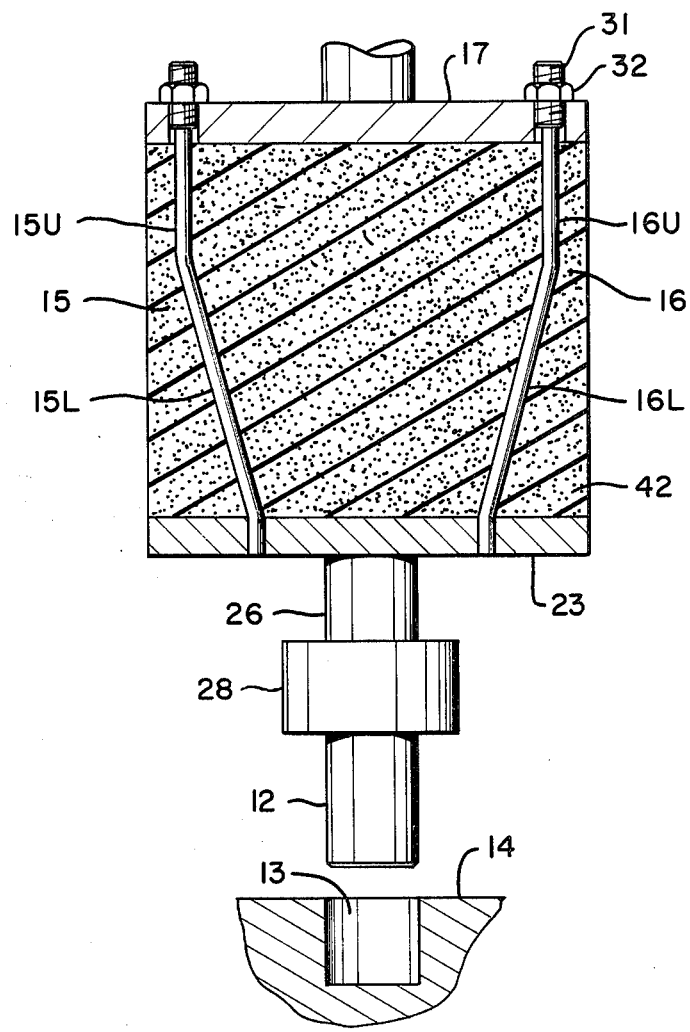
FIG. 7 is a diametrical longitudinal sectional view of another embodiment of the invention similar to the embodiment of FIG. 5 and having means of adjusting the preload in the wires or rod-like elements.

Referring to FIG. 7, there is shown a diametrical longitudinal sectional view of another embodiment of the invention similar to the embodiment of FIG. 6 but including means of adjustment of initial tension or preload of the rodlike portions 15U and 16U, and means of adjustment of the initial attitude of the assembly for use in other than vertical insertions. This adjustment is accomplished through nuts 32 which are connected to screws 31 which are in turn connected to rod-like means 16U and 15U.

These adjustments facilitate adjusting the assembly so that a part gripped in a rest position prior to insertion has its axis parallel to that of the opening in the work where the part is to be inserted.

Means of locking the adjustment such as lock nuts or washers can be added.

An advantage of arranging the device in compression is that a force greater than a preload force produces a yielding that acts as a safety device when an abnormally high force develops as the apparatus moves the piece towards the work, thereby preventing the build-up of a high force level and tending to prevent damage. The invention, while preferably acting vertically may also act horizontally or in any other direction.

There has been described novel apparatus and techniques for aligning items, such as a piece in a work opening. While the invention has been described with respect to inserting a piece into an opening, the principles of the invention may be used to move the opening upon the piece, to align multiple pins and openings and for other purposes. While the invention has been described with three wires or cables, more or fewer structural elements may be used within the principles of the invention.

It is evident that those skilled in the art may now make numerous other uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A remote axis admittance system comprising,
a first support means for receiving an actuating force,
compliance means secured to said first support means and having a first portion defining a translation region and a second portion defining a rotation region,
said first and second portions being contiguous,
a second support means coupled to said first support means by said compliance means for supporting part gripping means,
and part gripping means carried by said second support member,
said translation region responding to a force developed about a compliance center or axis embraced by said part gripping means by deflecting in a direction producing translation of said part gripping means and said rotation region responding to a moment by producing rotation about said compliance center or axis.

2. A remote axis admittance system in accordance with claim 1 wherein said compliance means comprises a plurality of rod-like members connected between said first and second support means with said first portion being portions of said rod-like members normally parallel to and spaced from the axis of said part gripping means and said second portion being portions of said rod-like members forming an acute angle with but spaced from said axis.

3. A remote axis admittance system in accordance with claim 2 where said rod-like members are symmetrically disposed about said axis.

4. A remote axis admittance system in accordance with claim 3 wherein there are three of said rod-like members.

5. A remote axis admittance system in accordance with claim 3 wherein said admittance means further comprises,
elastomeric material between said first and second support means surrounding said rod-like members.

6. A remote axis admittance system in accordance with claim 5 wherein said rod-like members comprise metal flexible cable,
and further comprising a spacer member between said first and second portions.

7. A remote axis admittance system in accordance with claim 3 wherein said rod-like members comprise spring wire.

8. A remote axis admittance system in accordance with claim 1 and further comprising elastic means coacting with said first and second portions for providing an elastic force with said first and second portions constraining motion in response to an actuating force applied to said first support means.

9. A remote axis admittance system in accordance with claim 8 wherein said elastic means comprises means for preloading said first and second portions.

10. A remote axis admittance system in accordance with claim 9 wherein said elastic means comprises means for preloading said support means in tension.

11. A remote axis admittance system in accordance with claim 9 wherein said elastic means comprises means for preloading said first and second portions in compression.

12. A remote axis admittance system comprising,
a first support means for receiving an actuating force,
compliance means secured to said first support means and having a first portion defining a translation region and a second portion defining a rotation region,
a second support means coupled to said first support means by said compliance means for supporting part gripping means,
part gripping means carried by said second support means,
said translation region responding to a force developed about a compliance center or axis embraced by said part gripping means by deflecting in a direction producing translation of said part gripping means and said rotation region responding to a moment by producing rotation about said compliance center or axis,
and damping means coupled to said compliance means for damping said system to significantly reduce oscillations.

* * * * *